United States Patent [19]

Howard

[11] 4,064,301
[45] Dec. 20, 1977

[54] FLORAL BASE
[75] Inventor: John H. Howard, Lexington, Ky.
[73] Assignee: Day Star Foam Company, Lexington, Ky.
[21] Appl. No.: 768,337
[22] Filed: Feb. 14, 1977
[51] Int. Cl.² .............................................. B32B 3/26
[52] U.S. Cl. .................................... 428/151; 156/257; 156/278; 264/321; 428/167; 428/306; 428/315
[58] Field of Search ................ 264/321; 428/904, 151, 428/147, 167, 168, 304, 306, 310, 315; 156/257, 278

[56] References Cited
U.S. PATENT DOCUMENTS

| | | | |
|---|---|---|---|
| 466,376 | 1/1892 | Shannon | 428/67 |
| 2,618,901 | 11/1952 | Braun | 47/41 |
| 2,724,642 | 11/1955 | Brown | 41/41 |
| 2,745,218 | 5/1956 | Cruce | 47/41 |
| 2,751,946 | 6/1956 | Gramelspacher | 144/309 |
| 3,041,193 | 6/1962 | Hamway et al. | 428/904 |
| 3,312,586 | 4/1967 | Barlow | 428/904 |
| 3,561,181 | 2/1971 | Bassett | 52/309 |
| 3,660,218 | 5/1972 | Shepherd et al. | 428/904 |
| 3,719,549 | 3/1973 | Mittman | 428/904 |
| 3,876,491 | 4/1975 | Martel | 428/904 |

Primary Examiner—William J. Van Balen
Attorney, Agent, or Firm—Wood, Herron & Evans

[57] ABSTRACT

A floral base is made by hot wire cutting a foam of expanded polystyrene beads, thereby forming a smooth skin over the cells at the cut surface; differentially wire brushing the hot wire cut surface, lightly in some areas so that the wires only slice the surface skin and more deeply in adjacent areas so that the wires gouge out beads to form cavities and roughly parallel channels; then coating the surface with a latex paint. The resultant material surprisingly simulates the appearance of rough weathered lumber.

10 Claims, 4 Drawing Figures

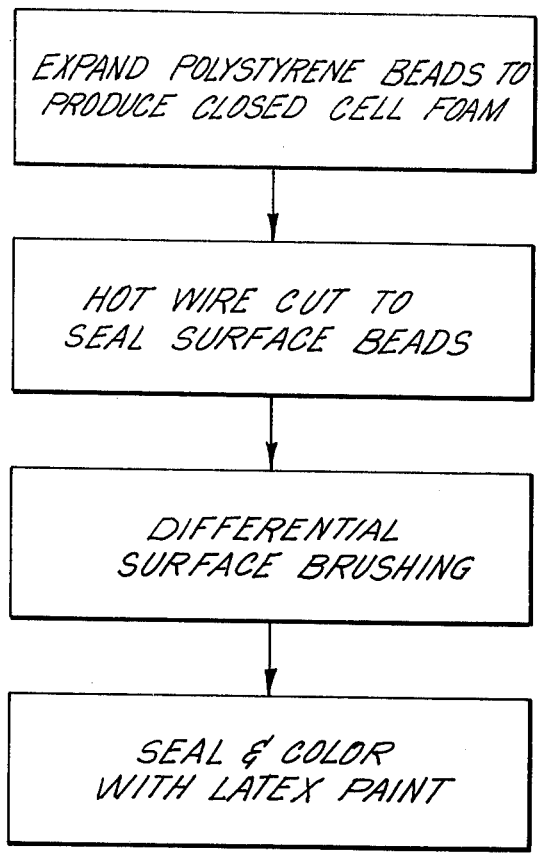
Fig. 1
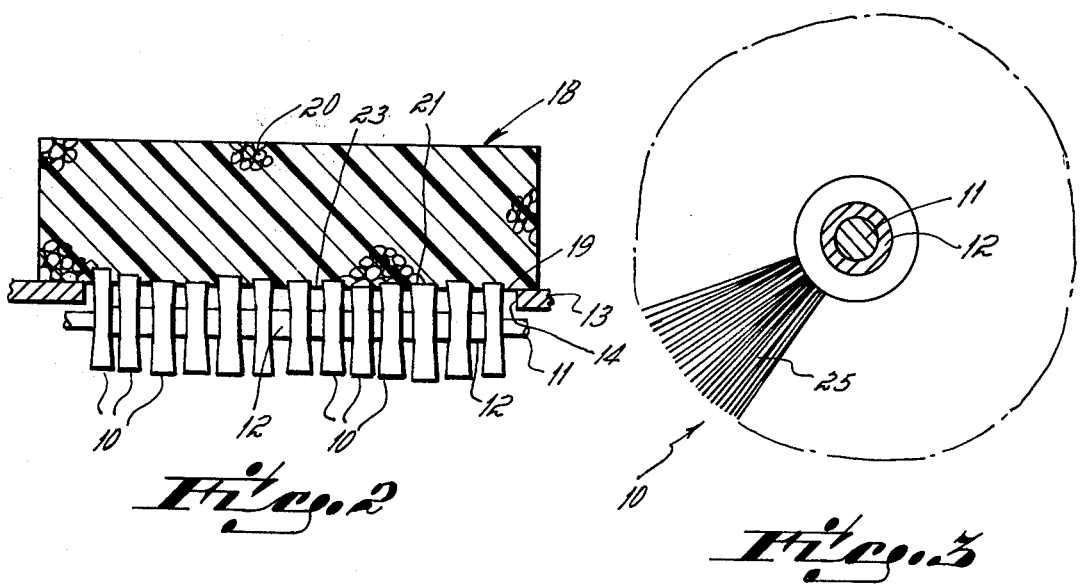
Fig. 2
Fig. 3

FLORAL BASE

FIELD OF THE INVENTION

This invention relates to the production of a lightweight foam material which has the appearance of weathered rough lumber and which, among other uses, is especially suitable for floral bases, i.e., supports or plaques upon which floral arrangements can be mounted.

BACKGROUND OF THE INVENTION

In the floral industry it is common practice to mount arrangements of dried fresh flowers on some sort of base to hold the arrangement in desired position and present them attractively and appropriately. Perhaps most frequently such bases are in the shape of a flat rectangular "board", but "logs" and other three-dimensional shapes such as vases or columns are also common for this purpose. The major function of the support or base is merely to mount the flowers; it is not necessarily required to contain or retain moisture or provide any sort of preservative affect. The arrangement is tied or wired to the base, or quite commonly spike-like "picks" are mounted to the ends of the individual stems and these are pressed into the base material to hold the flowers projecting from it.

The use of polystyrene foam for floral bases is disclosed in U.S. Pat. No. 2,618,901 and 2,745,218. At the present time, the extruded form of polystyrene foam ("Styrofoam") is very widely used for this purpose. It is lightweight, sufficiently durable, and is rigid enough to hold floral spikes. Nevertheless, ordinary polystyrene foam leaves a great deal to be desired in respect to appearance. The material has an unmistakable plastic look about it which is incongruous with real flowers, and which cheapens the overall appearance of any arrangement. Coloring the foam green, as is often done, does little to improve it. Because of the unsightliness of the base, the arrangement is often placed so as virtually to cover or conceal it and thereby render it as inconspicuous as possible. Thus the need has existed for a base which, while retaining the desirable mechanical qualities of polystyrene foam, will present a more attractive and natural appearance.

In accordance with a primary objective of this invention, a foam floral base material is provided which has a surface that is textured so as to resemble weathered rough lumber such as old barn siding.

PRIOR ART

U.S. Pat. No. 3,561,181 describes a replica wood beam made of molded urethane foam. While that material has an ultrarealistic woodlike appearance, it has a very tough outer skin as a result of the molding technique by which it is made. The skin is not readily pierceable for securing flowers to the foam. This would render such material difficult to use and thus mechanically unsuitable as a floral base material. Moreover, the economics of the molding process by which it is made render it non-competitive with the present foam floral base material.

Similarly, molded polystyrene foam has a rather tough skin which renders it also difficult to use; moreover moldings of that material do not present the richness of surface detail that molded urethane replicas can achieve.

U.S. Pat. No. 466,376 shows a method of rolling or pressing grooves into the surface of a soft wood such as pine or poplar, to provide a "surface series of numerous small indentations or cuts", thereby to imitate the more pronounced and different grain of a hardwood. The grooving treatment is carried out with a roller mounting a series of sharply ridged or toothed wheels which press corresponding grooves into the wood.

U.S. Pat. No. 2,724,642 shows a process for embellishing sawed panels of certain types of wood having alternating hard-soft grain lines, to imitate Japanese sugi wood. That process involves impregnation, drying, heating to thermochemically induce tones, and brushing through a mask to abrade the surface.

In U.S. Pat. No. 2,751,946 plywood panels are constructed on a veneer layer glued over a backing sheet, followed by wire brushing to gouge out the soft grain of the veneer facing and the backing sheet.

BRIEF DESCRIPTION OF THE INVENTION

If one attempts to simulate a wood grain appearance by exposing extruded polystyrene foam to the abrading action of a rotary wire brush, the result is a very grainy, open celled, particulate, homogeneous surface which looks more like sandstone rock, than like wood; the material has a cold appearance which generally is unappealing and which does not particularly simulate wood.

If, again, one attempts to simulate a wood grain appearance by wire brushing urethane foam, the result is a very dead, characterless, "flat" surface. Unlike the appearance of brushed extruded polystyrene foam, the brushed urethane foam shows every wire cut as a distinct narrow furrow. This result, though different, is also unrealistic and unattractive.

On the other hand, foam polyethylene is so elastic or resilient that it does not respond effectively to brushing; brushing it does not produce a result that simulates wood.

Unlike other foam materials, however, I have surprisingly found that a strongly appealing simulation of weathered, rough lumber such as barn siding, can be imparted by utilizing as a base material a rigid closed cell foam of expanded, cohered polystyrene beads, having a density of 0.7 to 2.0 pounds per cubic foot, especially if the surface is first cut and sealed by the "hot wire" technique. This material is then given a surface treatment as described hereinafter.

Extruded polystyrene foam is produced by injecting a volatile liquid such as methyl chloride into molten polystyrene resin in an extruder. As it emerges from the extruder die, the mass expands to form a low density log which is then sliced or cut to shape. In consequence of this method of manufacture, it has a continuous, homogeneous open cell structure.

In contrast to this, in the manufacture of expanded polystyrene, a blowing agent is incorporated in polystyrene beads as they are polymerized. The beads may be molded and expanded simultaneously in a closed mold, or they can first be "pre-expanded" by heating while they remain separated, and the cohering and molding of the pre-expanded beads then carried out in a separate subsequent "block mold" operation. Unlike the higher degree of homogenity of extruded polystyrene, expanded bead polystyrene is relatively inhomogeneous in that it is comprised of a mass of cohered, generally spherical, originally discrete beads, each of which has a relatively heavy surface skin or boundary around a lacy internal foam network; overall it is something like a collection of balloons.

The bulk log or block of expanded bead polystyrene is next cut into boards or other desired shapes. While this can be done by sawing or slicing, in the preferred method of carrying out the invention the hot wire technique is used because, unlike sawing or slicing, the hot wire tends to "heal" or seal the cut bubbles, to provide a smooth, closed cell surface skin which is quite different in appearance from the open cells of sawed polystyrene. Surprisingly more realistic results are obtained if the surface is formed by the hot wire technique.

The major surface of the shape thus formed, and preferably all of the surfaces which will be visible in use, are next exposed to an irregular brushing action by a rotating wire brush or a ganged set of brushes. The brushing action should be varied on different areas of the surface, such that in some areas the tips of the wires merely cut the skin of the expanded beads at the surface of the foam to provide a series of narrow, shallow slits or cuts, while in other areas the wires should gouge so deeply as to remove clusters of the expanded beads to form irregular cavities and roughly parallel channels. The surface so treated is then coated with a water-based latex paint, or other non-oil based paint, to seal and color the surface, preferably in a tone of brown or gray.

The resultant material retains all of its desirable mechanical qualities, that is, it is lightweight, rigid, and can receive and suppot flowers mounted to it by barbs or by tying, but in addition it has an amazingly appealing rustic appearance. This appearance is altogether different than the cold plastic look of other foam materials, even if they are similarly brushed and treated. To my knowledge no other brushed foam material can provide this new result.

DETAILED DESCRIPTION OF THE DRAWINGS

The invention can best be further described by reference to the accompanying drawings, in which:

FIG. 1 is a flow diagram illustrating the sequence of steps to be followed in accordance with the preferred method of carrying out the process of the invention;

FIG. 2 is an end elevation, partly in section, of apparatus including ganged wire brushes, for abrading a polystyrene foam board in accordance with a preferred method of carrying out the process of the invention;

FIG. 3 is a side elevation of an out-of-round wire brush for use in the invention.

DETAILED DESCRIPTION

Figure 4:
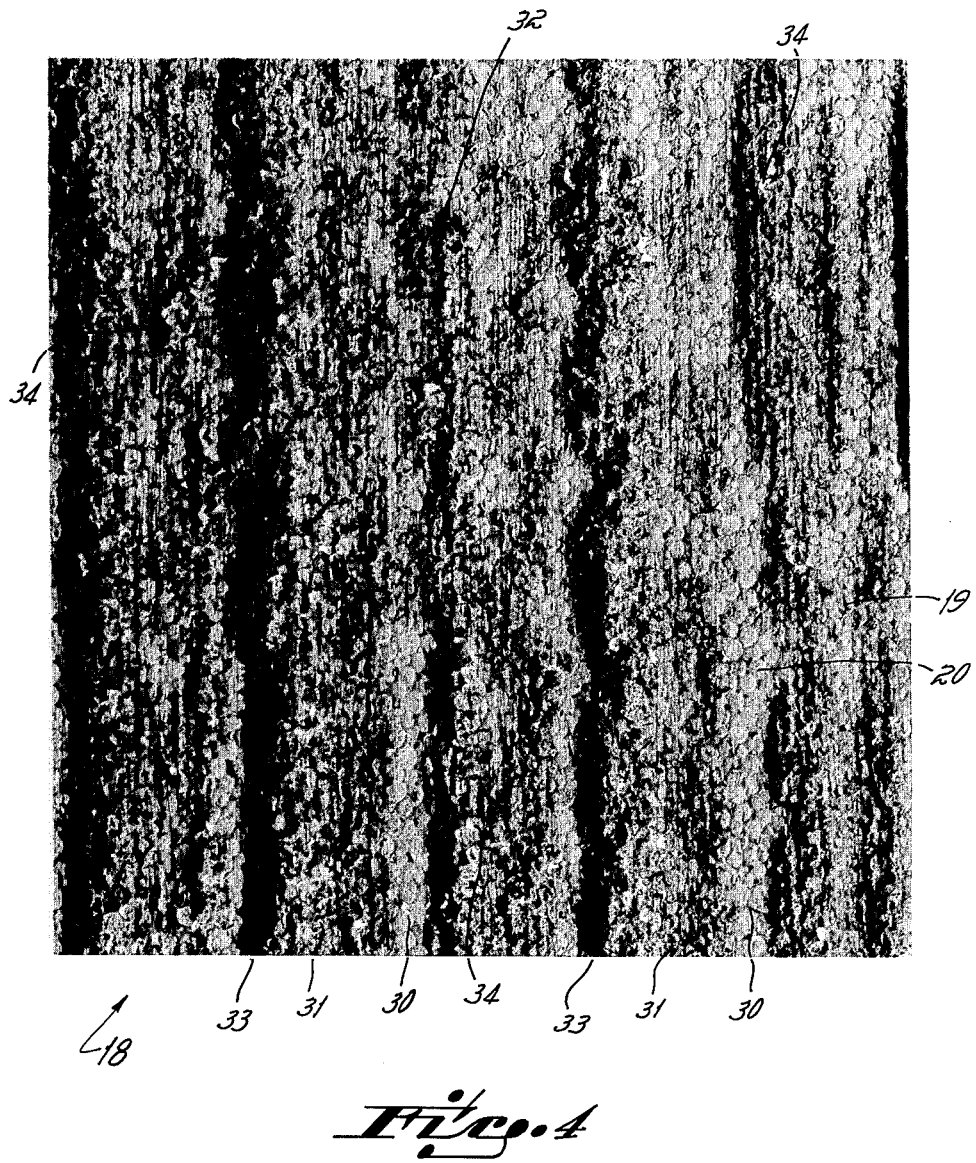
FIG. 4 is a full size photograph of the surface of a floral base board in accordance with the invention.

Referring to the drawings in more detail, the several steps of the preferred embodiment of the method of this invention are disclosed schematically as a flow diagram in FIG. 1.

FIG. 2 illustrates production apparatus for differentially brushing the cut foam surface in a single pass. A plurality of wire brushes 10, which preferably are of irregular and/or differing diameters, are ganged on a rotatable shaft 11, spaced apart by spacers 12. Shaft 11 is journaled below the surface of a work table 13 with the tops of the brushes projecting through a slot or opening 14 in the work table surface, somewhat as the blade of a table saw projects upwardly above the table. A slab or board 18 of cohered expanded polystyrene beads has at least one major surface 19 which has been formed by the hot wire cutting technique. In the interior of foam slab 18 the individual cohered beads (as indicated at 20, greatly exaggerated in size) are roughly spherical; but at the cut surface 19, the hot wire has formed a skin 21 over the cut surface of the beads which is distinctly flat as contrasted to the "pebbled" surface uncut beads would present.

By way of example, but not limitation, the individual brushes 10 may be standard wire brushes having generally similar diameters, in the range of 3 to 6 inches; the variation in actual diameters or out-of-roundness from brush to brush preferably should not exceed about $\frac{1}{8}-\frac{1}{4}$ inch, lest some of the brushes gouge too deeply while others fail to cut. The brushes may be separated by about 1 to 3 inches by the spacers 12. The width of the individual brushes at their peripheries may be about $\frac{3}{4}$ to $1\frac{1}{2}$ inches so that the clearance or gap is between them is small, about $\frac{1}{4} - 178$ inch. Shaft 11 is rotated, as by a motor not shown, and may suitably be driven at a rate of about 1750 rpm. The tops or tips of the brushes should not project more than about $\frac{1}{8}- \frac{1}{4}$ of an inch above the surface of table 13. From FIG. 2 it will be noted that in the area between adjacent brushes, no surface brushing occurs as at 23.

The block 18 can be pushed or advanced manually over the brushes with just sufficient pressure to hold it down onto the brushes. The brushes are preferably irregularly spaced, and it is desirable, for better simulation, that the pressure with which the material is held down on the brushes be varied as it is moved over them, to produce grooves of irregular width. The material is desirably advanced in a slightly irregular line, rather than along a perfectly straight path, to simulate the normal natural curvature of grain lines in wood.

FIG. 3 is a side illustration of a brush 10. To produce an irregular or differential brushing action, the wires 25 of the brush may be deformed or mashed, as by randomly hammering them inwardly toward the center, so that the contour of the brush is irregular rather than perfectly circular. Those skilled in the art will understand that the differential brushing treatment can be carried out with a single brush in a plurality of passes, as an alternative to the ganged brushing operation shown in FIG. 2.

On hot wire cut, expanded polystyrene bead foam the brushing action creates a variety of different surface affects which together impart the attractiveness of the surface. These different affects are shown in the photograph which is FIG. 4. In some areas, as at 30, the flat surface is not scored or marked at all. These areas correspond to the areas 23 in FIG. 2, which are not touched by the wire brushes. In some areas, as at 31, the surface has been slightly cut or scored by the individual wires of the brushes, forming striations or grooves. At still other areas, where the brushes gouge more deeply into the surface, chunks of beads have been removed to form cavities, as at 32. In still other areas, continuous but irregular grooves are formed, as at 33. In the bottoms of the grooves and cavities, the generally spherical surfaces of the underlying beads are exposed, as at 34. The rounded bead surfaces are in large part scarified by the wire brushes to present a much rougher appearance there.

The resultant overall surface appearance differs distinctly from that of any other foam material, even if such other foam material is passed in the same manner over the same set of brushes. It is my belief that the inhomogeneities arising from the coalesced bead structure are in part responsible for this difference.

Following the surface brushing treatment, any residual pieces of abraded foam that adhere to the surface may be removed as by vacuuming or wiping. Following this the surface is sealed and colored. A conventional water-based latex paint such as "Spred Satin", supplied by Glidden Paint Co., may be used for this purpose. A paint which is brown or tan in color best simulates the appearance of weathered wood. I have further found it to be desirable to dilute the paint roughly 50% by volume with water, to minimize the formation of a heavy "crust" on the foam. It should be pointed out that oil base paint cannot readily be used since the organic solvents in them tend to degrade the foam and destroy the surface detail. In order better to seal and harden the surface, a small amount, up to about 8%, of a water-dispersible foam glue, such as that supplied by Kentucky Adhesive Co., Nicholasville, Kentucky, under their designation KAC 22-165, can be mixed into the paint. This is not required and satisfactory results can be obtained without inclusion of the glue, however the glue does harden the surface so that the surface can be brushed off to remove dust without dislodging beads and thereby exposing the white interior beads.

The resultant foam material, in the form of plaques, cubes, crosses, columns ("logs") or the like, presents qualities which are especially desirable for floral bases. It presents a highly realistic, natural looking floral base, particularly if all of its visible surfaces are so treated. Those skilled in the art will recognize its utility for other purposes, as for example simulated wooden beams, drop ceilings, and the like.

Having described the invention, what is claimed is:

1. The method of simulating the appearance of rough weathered lumber with a foam material, comprising,
   providing a rigid, closed cell foam of cohered, expanded polystyrene beads,
   cutting said foam to form a desired shape therefrom,
   wire brushing the surface of said shape to form spaced, elongated, generally parallel but irregular grooves and cavities on it while varying the brushing action on different areas of said surface such that at some regions thereof the beads at the surface are merely cut by the wires of the brush while at other regions the wires gouge so deeply as to remove beads as irregular chunks and thereby form said cavities and grooves,
   removing the loose abraded material,
   and applying a latex paint over the surface so prepared to seal and color the same.

2. The method of claim 1 wherein said cutting is carried out by the hot wire technique, so that a smooth surface skin is formed over the cut beads.

3. The method of claim 1 wherein said surface is brushed by a rotating gang of spaced apart wire brushes of irregular shapes.

4. The method of claim 3 wherein said wire brushes are mashed radially inwardly to deform the brushes prior to said brushing.

5. The method of claim 1 wherein said latex paint is thinned approximately 1:1 by volume with water.

6. The method of claim 1 wherein said latex paint is admixed with up to about 8 percent by weight of a water dispersible foam glue.

7. A foam material which simulates weathered rough lumber,
   said material being a rigid, closed cell foam of cohered, generally spherical expanded polystyrene beads and having a cut major surface,
   the cut beads at said major surfaces having a flat skin thereover,
   a series of generally parallel irregular grooves and cavities of differing width and depths formed in said major surface,
   said grooves and cavities being defined by removal of groups of entire beads,
   said major surface also having thereon a plurality of much narrower, elongated shallow slit-like cuts,
   said surface being coated with a latex paint.

8. The material of claim 7 wherein said major surface is a hot wire cut surface.

9. The material of claim 7 wherein said foam has a density of about 0.7–2.0 lbs. per cubic foot.

10. The material of claim 7 wherein the beads in said grooves in part present generally spherical exposed surfaces.

* * * * *